R. ROTH AND B. RITTHAMER.
APPARATUS FOR MOLDING HAMS.
APPLICATION FILED AUG. 12, 1919.
1,364,411. Patented Jan. 4, 1921.
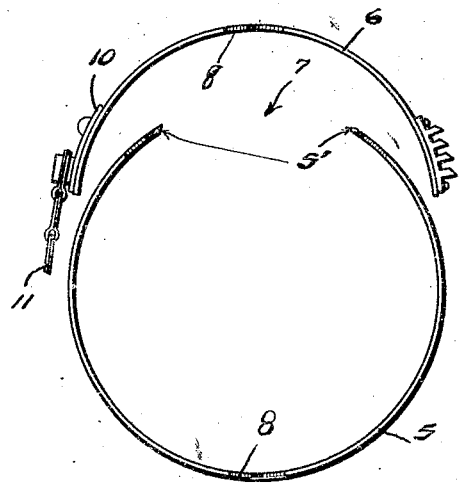
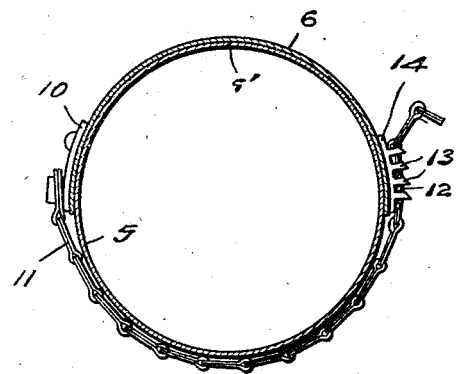
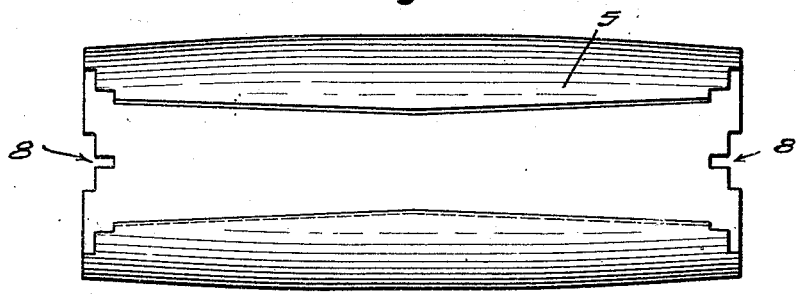
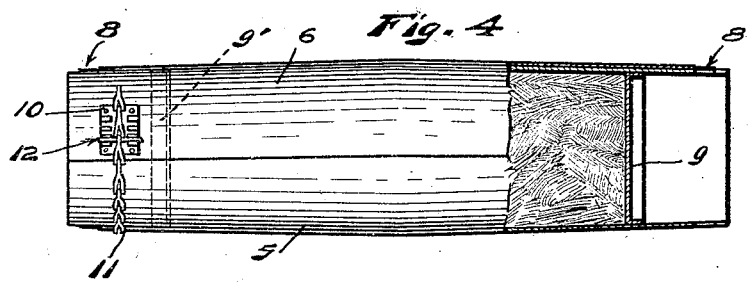
Inventors
Boleslaw Ritthammer
René Roth
By their Attorney
Frank Warren

UNITED STATES PATENT OFFICE.

RENÉ ROTH AND BOLESLAW RITTHAMER, OF SEATTLE, WASHINGTON.

APPARATUS FOR MOLDING HAMS.

1,364,411.     Specification of Letters Patent.     Patented Jan. 4, 1921.

Application filed August 12, 1919. Serial No. 317,073.

*To all whom it may concern:*

Be it known that we, RENÉ ROTH, a citizen of France, and BOLESLAW RITTHAMER, a citizen of the United States, residing at Seattle, in the county of King and State of Washington, have invented a certain new and useful Improvement in Apparatus for Molding Hams, of which the following is a specification.

Our invention relates to improvements in the process and apparatus for molding or compressing hams and is an improvement on the meat mold shown and described in United States Letters Patent Number 1,182,040 issued to Boleslaw Ritthamer on date of May 9, 1916.

The object of our invention is to provide a meat mold that is simple in its plan of construction and efficient in its operation and is adapted to compress a ham from which the bone has been removed into a cylindrical form.

A further object is to provide a meat mold that will tend, when a boned ham is compressed therein, to wrap the skin about the ham thereby dispensing with the necessity of wrapping the ham in canvas or cloth and sewing the same preparatory to cooking.

A still further object is to provide a meat mold that converges slightly toward the end thereof and is provided with end members that are arranged to be moved outwardly by the pressure of the meat mold so that the hams will all be pressed to the same diameter but will be of different lengths corresponding to the size of the ham.

The invention consists in the novel construction of a meat mold and in the novel process of compressing and cooking hams in such mold as will be more clearly hereinafter described and claimed.

We accomplish these objects by devices illustrated in the accompanying drawings, wherein—

Figure 1 is a view in end elevation of a meat mold constructed in accordance with our invention showing the two parts thereof separated and in the positions that they will assume when released from pressure;

Fig. 2 shows the same mold in a closed or compressed position;

Fig. 3 is a plan view of one section of the mold; and

Fig. 4 is a view partly in cross-section and partly in elevation of the mold as it may appear when a ham is compressed therein.

Referring to the drawings, throughout which like reference numerals indicate like parts, the numerals 5 and 6 designate the two parts of a meat mold which are preferably constructed of relatively thin resilient sheet metal that is formed by stamping into substantially the shape shown in the drawings and which are hereinafter designated as the ham receptacle and the cover member respectively.

The ham receptacle 5 is a relatively long shell of substantially circular cross-sectional shape that converges slightly at each end and is open on one side as at 7 to permit the ham to be inserted therein. When the ham receptacle 5 is empty and unrestrained the width of the opening in the side thereof will be normally equal to about one sixth of the circumferential distance around such shell.

The edges of the ham receptacle 5 on each side of the opening 7 are beveled as at 5' and are inclined slightly from the center toward the ends thereof, as shown in Fig. 3, so that after such edges have been pressed together at the center of the mold further pressure will cause a contraction of the ends of the mold while the size at the center will remain the same.

The cover member 6 is of substantially the same length and convergent shape as the receptacle 5 and when free is of arcuate shape and slightly less than a semi-circle in cross-section.

The ham receptacle 5 and cover member 6 may each have notches 8 in the ends thereof that adapt them to fit into a press, not herein shown or described.

In Fig. 4 we have shown flanged end members or disks 9 that are adapted to fit within the ham receptacle 5.

The cover member 6 may be provided with any suitable retaining means for holding the mold in a closed position after it has been compressed about a ham, as, for instance, such cover member may be provided adjacent each end with a plate 10 to which is secured a chain 11 having cross pins 12 that are adapted to be hooked between teeth 13 on another plate 14 that is secured to the opposite side of the cover member, the chain being arranged to extend around the ham receptacle 5 and bind the ham receptacle and cover member 6 firmly in a closed position.

In the use of our mold the bone of the ham is first removed, the skin is then drawn around the meat as far as possible and the ham is placed in the receptacle 5 by laying the skin side on the opening 7 and crowding the ham downwardly into the receptacle, the edges of the receptacle tending to keep the ham rolled and to draw the skin tightly around the meat and the receptacle springing open sufficiently to permit the ham to be pressed into it.

The end disks 9 may then be pressed against the ends of the ham, the cover member 6 may be placed over the opening 7 and the mold inserted into a press by which a pressure may be exerted on the mold to compress it into the position shown in Figs. 2 and 4. The chains 11 may then be made fast to the teeth 13 to hold the mold in the compressed position, the mold may then be removed from the press and the ham within the mold may be subjected to any desired cooking process.

As the mold is compressed the end disks 9 will be held between the convergent walls of the mold and will form flat ends on the roll of ham. If the pressure becomes too great the end disks 9 will yield slightly thus permitting the roll of ham to elongate as its diameter is reduced.

If desired pieces of cloth or canvas may be placed over the end disks 9 to make said mold air tight.

It is obvious that a ham molded and cooked within the meat mold above described will retain all its natural flavor and nutriment and will remain in a solid mass without the use of cloth or canvas or without being sewed together in any manner.

It is also obvious that changes in the form of construction and arrangement of parts of our mold may be resorted to without departing from the spirit of our invention.

What we claim is:

1. A meat mold comprising a compressible cylindrical receptacle open on one side, a compressible semi-cylindrical cover member arranged to fit over the open side of said receptacle and end disks arranged to fit within said receptacle.

2. A meat mold comprising a compressible receptacle of cylindrical shape and tapered slightly from the center to the ends thereof said receptacle being open on one side, a compressible cover member shaped to conform to the shape of said receptacle and arranged to fit over the open side of said receptacle, and an end disk arranged to fit within each end of said receptacle.

3. A meat mold comprising a cylindrical receptacle of spring metal open on one side, a semi-cylindrical cover member of spring metal arranged to fit over the open side of said receptacle, end disks arranged to fit within said cylindrical receptacle, and means for holding said receptacle and said cover member in a compressed position.

4. A meat mold comprising a substantially cylindrical receptacle of spring metal that is tapered slightly from center to ends thereof and is provided on one side with a longitudinally extending opening of a normal width equal to substantially one sixth of the diameter of said receptacle, a cover member of spring metal shaped to conform to the shape of said receptacle and arranged to fit over the open side thereof, end disks arranged to fit within said receptacle, and means for holding said receptacle and said cover member in a compressed position.

In witness whereof we hereunto subscribe our names this 5th day of August, A. D. 1919.

RENÉ ROTH.
BOLESLAW RITTHAMER.